US00RE37712E

(19) United States
(12) Reissued Patent
Gannon

(10) Patent Number: US RE37,712 E
(45) Date of Reissued Patent: May 28, 2002

(54) CLIP FRICTION HINGE

(75) Inventor: Dean Gannon, St. Paul, MN (US)

(73) Assignee: Reell Precision Manufacturing Corporation, St. Paul, MN (US)

(21) Appl. No.: 09/465,171

(22) Filed: Dec. 16, 1999

Related U.S. Patent Documents

Reissue of:
(64) Patent No.: 5,697,125
Issued: Dec. 16, 1997
Appl. No.: 08/563,218
Filed: Nov. 27, 1995

(51) Int. Cl.[7] ..... E08D 11/08
(52) U.S. Cl. ..... 16/342
(58) Field of Search ..... 16/337, 338, 341, 16/342, 257; 296/97.12, 97.13; 188/83

(56) References Cited

U.S. PATENT DOCUMENTS

| | | | | |
|---|---|---|---|---|
| 315,936 | A | 11/1885 | Pfingst | 16/342 |
| 1,166,551 | A | 1/1916 | Simmons | 16/342 |
| 2,462,304 | A | 2/1949 | Burdick | 16/342 |
| 2,605,926 | A | 8/1952 | Casey | |
| 3,030,783 | A | 4/1962 | Schmidt | |
| 3,213,500 | A | 10/1965 | Thompson | |
| 3,395,553 | A | 8/1968 | Stout | |
| 3,765,054 | A | 10/1973 | Johnson et al. | 16/342 |
| 4,190,929 | A | 3/1980 | Palka | 16/381 |
| 4,227,283 | A | 10/1980 | Mathewson et al. | |
| 4,688,961 | A | 8/1987 | Shioda et al. | |
| 4,790,504 | A | 12/1988 | Wills et al. | |
| 4,916,968 | A | 4/1990 | Kabaya | |
| 4,986,507 | A | 1/1991 | Chiang | |
| 5,010,983 | A | 4/1991 | Kitamura | |
| 5,018,244 | A | 5/1991 | Hino | |
| 5,037,231 | A | 8/1991 | Kitamura | |
| 5,041,818 | A | 8/1991 | Liu | |
| 5,043,846 | A | 8/1991 | Kinoshita | |
| 5,052,078 | A | 10/1991 | Hosoi | |
| 5,064,137 | A | 11/1991 | Komatsu | |
| 5,088,156 | A | 2/1992 | Hosoi | |
| 5,108,062 | A | 4/1992 | Detwiler | 16/342 |
| 5,197,704 | A | 3/1993 | Kitamura | |
| 5,211,368 | A | 5/1993 | Kitamura | |
| 5,219,240 | A | 6/1993 | Kitamura | |
| 5,231,734 | A | 8/1993 | Rude | |
| 5,235,494 | A | 8/1993 | Chang et al. | 16/262 |
| 5,354,028 | A | 10/1994 | Kitamura | |
| 5,364,149 | A | 11/1994 | Aymerich et al. | 16/342 |
| 5,491,874 | A | 2/1996 | Lowry et al. | 16/342 |
| 5,613,275 | A | 3/1997 | Kolberg et al. | 16/342 |

*Primary Examiner*—Chuck Y. Mah
(74) *Attorney, Agent, or Firm*—Kinney & Lange P.A.

(57) ABSTRACT

The present invention is a torque producing apparatus comprising a first member, a second member, and a retention means. The first member has first and second arms, each having first and second ends, and a connection portion adjacent the joined first ends of the first and second arms. The arms have an outer surface and define an axial aperture. The axial aperture defines at least a portion of an inner surface of the arms. The second ends of the arms define an opening between the touter and inner surfaces. At least one of the inner and outer surfaces have a predetermined diameter when the member is in a relaxed state. The second member has a surface arranged to engage in interference fit against at least one surface of the first member when the first member is in its relaxed state. The retention means engages the connection portion of the first member so that the second member rotates relative to the first member upon relative rotation of the second member and the retention means.

26 Claims, 3 Drawing Sheets

CLIP FRICTION HINGE

Matter enclosed in heavy brackets [ ] appears in the original patent but forms no part of this reissue specification; matter printed in italics indicates the additions made by reissue.

BACKGROUND OF THE INVENTION

The present invention relates to torque-producing friction hinges. More specifically, the present invention relates to a clip or multiple clips radially compressed on a shaft to produce rotational friction or torque between the shaft and the clip(s).

Friction hinge devices are used to support objects at selected angular positions relative to a main body. For example, friction hinges are used in notebook computers to support a computer screen at various angular locations relative to a computer base. They are also used to support windshield visors in motor vehicles at various angles.

One type of friction hinge is a spring hinge which utilizes a helical spring wrapped around a shaft. In a relaxed state, the spring has an inner diameter less than the outer diameter of the shaft to frictionally engage the shaft so that the spring and shaft will tend to rotate together. In use, the shaft is connected to a rotatable body. As the body and the shaft are rotated, one of the spring ends or "toes" is oriented to contact a stop, which is typically part of a stationary support. The engagement of the spring toe with the step will cause the spring to slip relative to the shaft, rather than rotate with the shaft. This will generate torque. Such a spring hinge can be designed to provide a fairly constant torque or resistance to rotation throughout its range of motion.

Another type of a friction hinge device is an axial compression hinge. An axial compression hinge includes at least two friction discs compressed against each other on a shaft. The axial compression hinge utilizes a compression force along the axis parallel with its shaft. An arm is attached to one of the friction discs while the other friction disc is secured to the shaft. As the arm is rotated relative to the shaft, the friction between the surfaces of the discs creates torque.

Both the spring hinge and the axial compression hinge have limitations and difficulties. For example, with respect to the axial compression hinge, it is often difficult to attach the friction discs to the arms and also difficult to secure the discs to the shaft. The difficulty in attaching the arms to the discs greatly increases when additional discs are added to the shaft in an attempt to increase torque. More particularly, each disc that is added must have an additional arm attached to it. The space limitations of most applications make the connection of additional arms impractical.

The axial compression hinge also must have a mechanism which sufficiently delivers enough axial compression force to maintain friction between the discs. It is often difficult to maintain a relatively constant axial compression force on the discs. This causes non-constant torque which is a very undesirable characteristic.

Also, the particular connection between the friction discs and the arm can affect the overall torque produced by the axial compression hinge. The friction effect is not constant or predictable and may also cause non-constant torque.

Finally, the friction discs must be formed to very specific tolerances. Variations in the size of the discs will significantly affect the overall torque of the device. This presents problems in machining multiple components to exact tolerances.

With respect to the spring hinge, the overall size of the spring hinge is often too large for certain applications requiring relatively large torque. With the spring hinge design, the most effect way to substantially increase torque is to add additional springs to the shaft. This will substantially increase the size of the package required to contain the friction spring hinge. Space limitations of many applications make the addition of spring elements impractical.

In addition, spring hinges require that the spring toe be secured to, or otherwise engage, the support base so that the spring is held stable as the shaft is rotated relative to the support base. However, if the spring toe is extended to engage a stop portion on the support base, this engagement will only occur in one direction of rotation of the shaft. In the opposite direction the spring toe will rise off the stop portion of the support base allowing the spring to rotate with the shaft. Hence, the torque producing effect of the spring hinge is unidirectional. Bi-directional spring hinges exist, but these usually require engaging a spring toe to the support base at both ends of the spring so that the spring is held stable as the shaft is rotated in either direction.

Spring hinges also require very accurate machine tolerances. The spring toes must terminate precisely at the stop portion of the support structure. The precise location of the spring toes relative to the stop is critical to the performance of the spring hinges. If the space between the spring toe and the stop is too large, the hinge will have free play, that is, there will be no torque for a limited range until the spring toe engages the stop. On the other hand, if the radial tolerance between the spring toe and the stop is too small, the toes will make the spring hover over the shaft resulting in no or low torque.

Finally, the overall torque of the spring hinge is usually significantly affected by the antirotation elements of the device. More specifically, the overall torque of the spring hinge is significantly affected by the engagement of the spring toe with the stop on the support base. As the spring toe engages the support base stop, the spring tends to "wrap open", that is, lift off the shaft. This decreases the friction between the spring and the shaft, which in turns decreases the torque produced by the spring hinge.

The present invention solves these and other problems associated with the prior art.

SUMMARY OF THE INVENTION

The present invention is a torque producing apparatus comprising first and second members and retention means. The first member has a first arm, a second arm, and a connection portion. The first and second arms have an inner and an outer surface and define an aperture. The first and second arms have an opening between the inner and outer surfaces. When the member is in a relaxed state, at least one of the inner or the outer surface has a predetermined diameter. The second member has a surface that engages one of the inner or outer surface of the first member. The retention means engages the connection portion of the first member so that the second member rotates relative to the first member upon relative rotation of the second member and the retention means.

In one embodiment of the present invention the second member is a rotatable shaft. The shaft has a surface with an outer diameter greater than a predetermined diameter of the inner surface of the first member when the first member is in a relaxed state. The surface of the shaft is engaged in interference fit to the inner surface of the first member. The retention means engages the connection portion of the first member so that the shaft rotates relative to the first member upon relative rotation of the shaft and the retention means.

In another embodiment of the present invention the second member is a sleeve. The sleeve has a surface with an inner diameter smaller than a predetermined diameter of the outer surface of the first member when the first member is in a relaxed state. The surface of the sleeve is engaged in interference fit to the outer surface of the first member. The retention means includes a shaft configured to engage the connection portion of the first member so that the sleeve rotates relative to the first member upon relative rotation of the sleeve and the shaft.

DETAILED DESCRIPTION OF THE PREFERRED EMBODIMENTS

Figure 1:
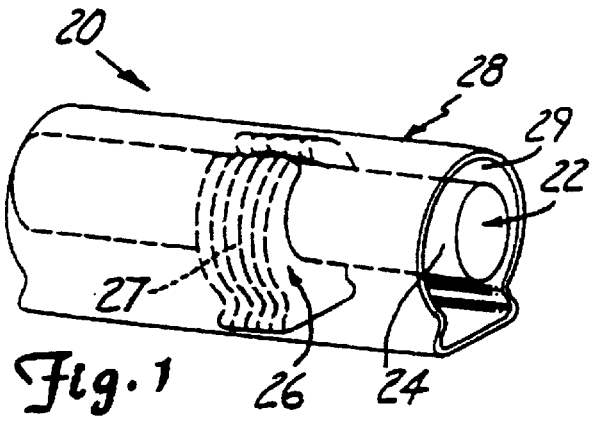
FIG. 1 is a perspective view of a friction hinge according to a preferred embodiment of the present invention.
Figure 2:
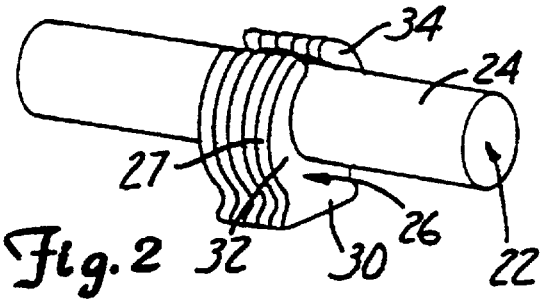
FIG. 2 is a perspective view of a partially assembled friction hinge according to a preferred embodiment of the present invention.
Figure 3:
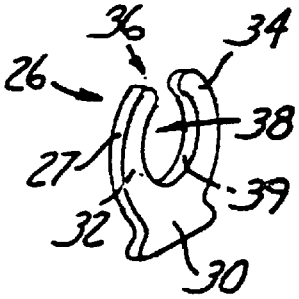
FIG. 3 is a perspective view of a clip for a friction hinge according to a preferred embodiment of the present invention.

FIGS. 1–3 show a torque producing apparatus 20 inn accordance with the present invention. Torque producing apparatus 20 includes shaft 22 which has a shaft surface 24, a plurality of clip members 26 and restraint 28. Members 26 are frictionally engaged to the shaft surface 24 of shaft 22. Restraint 28 has an inner restraint surface 29.

Each member 26 has an outer member surface 27 and includes connection portion 30, first arm 32, and second arm 34. First and second arms 32 and 34 are disjointed to define an opening or slit 36. First and second arms 32 and 34 include inner member surface 39 which defines aperture 38. (See FIG. 3). When member 26 is in a relaxed state, inner member surface 39 has a diameter smaller than the outer diameter of shaft surface 24. Consequently, when shaft 22 is connected though aperture 38 to member 26, inner member surface 39 frictionally engages shaft surface 24. Arms 32 and 34 of member 26 exert radial compression on shaft 22.

In a preferred embodiment of the present invention, outer member surface 27 of first and second arms 32 and 34 form a circular shape. Connection portion 30 comprises a rectangular-like projection with rounded protruding edges extending tangentially from the circular shape of first and second arms 32 and 34. In this way, the profile of outer member surface 27 appears substantially circular, with one overhanging portion extending tangentially off the circle. The diameter of the profile of outer member surface 27 is such that the radial thickness of arms 32 and 34 is substantially larger than the axial thickness of member 26.

Figure 1A:
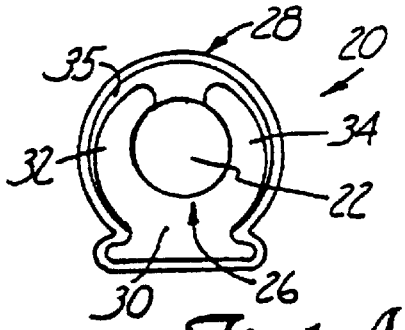
FIG. 1A is an end view of a friction hinge according to a preferred embodiment of the present invention.

Also in a preferred embodiment of the present invention, restraint 28 comprises a housing which contains members 26 and substantially contains shaft 22. Restraint 28 has a cylindrical-like body, a cross-section of which substantially matches the profile of outer member surface 27. Inner restraint surface 29 follows the shape of outer member surface 27. In the substantially circular portion comprising first and second arms 32 and 34, inner restraint surface 29 is spaced away from member 26 defining gap 35. (See FIG. 1A). The projection portion extending off the circular portion comprising connection portion 30 directly engages inner restraint surface 29.

In operation, torque producing apparatus 20 is used to produce torque. Restraint 28 is mounted to a stationary device, such as to the base of a notebook computer. Shaft 22 is attached to a rotatable body such as a computer screen in the notebook computer. Friction between member 26 and shaft 22 produces torque which may be utilized to support the screen at various angular locations relative to the base.

As shaft 22 is rotated, for example as the computer screen is lifted, friction caused by the interference fit between shaft surface 24 and inner member surface 39 causes member 26 to tend to rotate with shaft 22. However, inner restraint surface 29 engages connection portion 30 of member 26 such that member 26 is not able to rotate relative to restraint 28 as shaft 22 is rotated.

In operation, the restraint of rotation of members 26 relative to the shaft 22 causes resistance to rotation, or torque, as the computer screen is lifted relative to the computer base. In the preferred embodiment described above, the resistance caused by torque producing apparatus 20 will be substantially the same in either direction of the rotation of shaft 22. Unequal torque may be produced in opposite directions by forming arms 32 and 34 with unequal radial thickness, or unequal radial length from connection portion 30 (See FIG. 13).

The apparatus of the present invention allows smaller packages to produce larger torque than was possible with previous designs. By adding additional members 26 to shaft 22 of the apparatus of the present invention, torque will be increased. Unlike previous spring hinge designs where the addition of an entire spring was necessary to increase torque, the members of the present invention are relatively thin. Thus, torque is selectively increased with the present invention with no significant increase in overall size of the device.

Similarly, where previous axial compression hinges required additional connection arms and the like in order to increase torque, no such similar features are needed for the present invention. Thus, relative size for the device is less for the present invention than with previous designs.

In addition, the apparatus of the present invention can be utilized without the often complicating concerns of securing or stabilizing a spring toe. As previously discussed, the means of securing a spring toe can affect the torque produced. However, with the apparatus of the present invention the torque produced by the device is unaffected by antirotation elements. More particularly, the antirotation elements of the present invention, namely, the connection portion of the member, is separate from the friction elements, namely, the outer surface of the shaft and the inner surface of the member.

Figure 4:
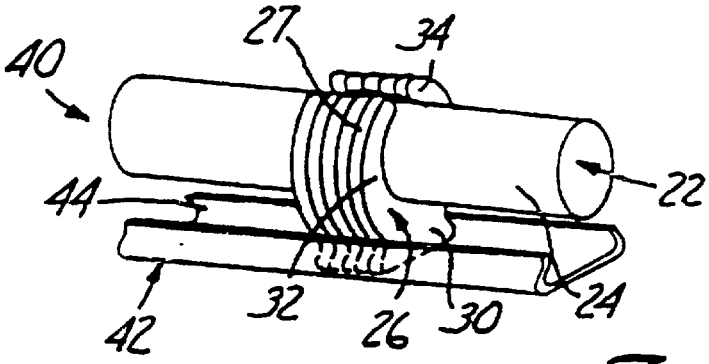
FIG. 4 is a perspective view of a friction hinge according to a first modification of the present invention.

FIG. 4 shows alternative torque producing apparatus 40 in accordance with the present invention. Torque producing apparatus 40 includes shaft 22 which has a shaft surface 24, a plurality of clip members 26 and restraint 42. Members 26 are frictionally engaged with shaft surface 24 of shaft 22. Restraint 42 has an inner restraint surface 44 which contacts outer member surface 27.

Shaft 22 and members 26 interact essentially as described above with respect to torque producing apparatus 20. However, restraint 42 only encompasses connection portion 30 of member 26. Inner restraint surface 44 follows the contour of outer member surface 27 on connection portion 30.

In operation, torque producing apparatus 40 is used to produce torque essentially as described above with respect to torque producing apparatus 20. As shaft 22 is rotated, friction between shaft 22 and member 26 causes member 26 to tend to rotate with shaft 22. Inner restraint surface 44 engages connection portion 30 of member 26 such that member 26 is not able to rotate relative to restraint 42 as shaft 22 is rotated, hence causing resistance to rotation, or torque.

Figure 5:
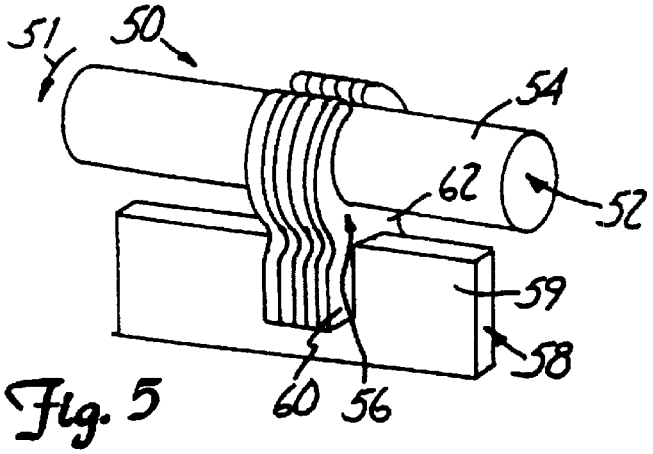
FIG. 5 is a perspective view of a friction hinge according to a second modification of the present invention.
Figure 6:
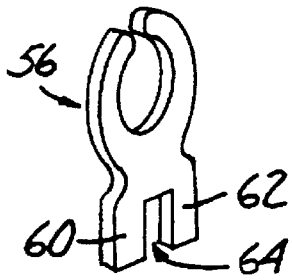
FIG. 6 is a perspective view of a clip for the friction hinge according to the second modification of the present invention.

FIGS. 5 and 6 show alternative torque producing apparatus 50 in accordance with the present invention. Torque producing apparatus 50 includes shaft 52 which has a shaft surface 54, a plurality of clip members 56 and restraint 58. Members 56 are frictionally engaged to shaft surface 54 of shaft 52 and each have a first connection portion 60 and a second connection portion 62, defining a slot 64. (See FIG. 6). Restraint 58 is oriented to fit into slot 64 and has an outer restraint surface 59. Thus, at least a portion of outer restraint surface 59 contacts both first and second connection portions 60 and 62.

In operation, torque producing apparatus 50 is used to produce torque essentially as described above with respect to torque producing apparatus 20. AS shaft 52 is rotated, friction between shaft 52 and member 56 causes member 56 to tend to rotate with shaft 52. However, outer restraint surface 59 of restraint 58 engages either the first or second connection portion 60 and 62 such that member 56 is not able to rotate relative to restraint 58 as shaft 52 is rotated.

For example, if shaft 52 is rotated in the direction of arrow 51 indicated in FIG. 5, member 56 will also tend to rotate in that same direction. However, as shaft 52 is rotated, first connection portion 60 contacts outer restraint surface 59 such that member 56 cannot rotate. Similarly, as shaft 52 is rotated in the direction opposite to arrow 51 in FIG. 5, member 56 will also tend to rotate in that direction and second connection portion 62 will contact outer restraint surface 59 such that member 56 cannot rotate.

In either direction of rotation the interference fit between outer restraint surface 59 of restraint 58 and first or second connection portion 60 and 62 causes resistance to rotation, or torque. The torque generated by torque producing apparatus 50 will be substantially the same in either direction of the rotation of shaft 52.

Figure 7:
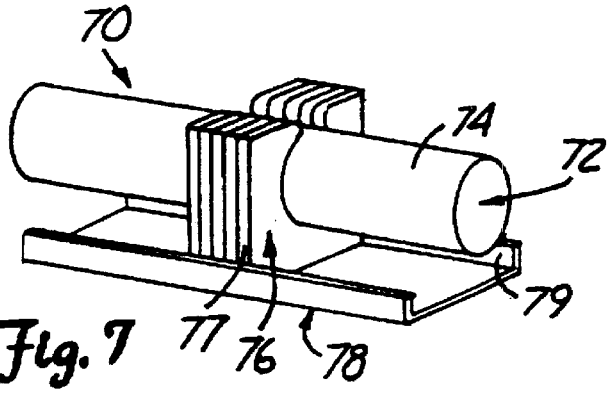
FIG. 7 is a perspective view a friction hinge according to a third modification of the present invention.
Figure 8:
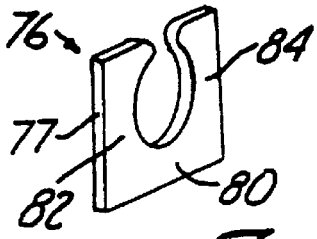
FIG. 8 is a perspective view of a clip for the friction hinge according to the third modification of the present invention.

FIGS. 7 and 8 show alternative torque producing apparatus 70 in accordance with the present invention. Torque producing apparatus 70 includes shaft 72 which has a shaft surface 74, a plurality of clip members 76 and restraint 78. Members 76 are frictionally engaged with shaft surface 74 of shaft 72. Restraint 78 has an inner restraint surface 79 which contacts outer member surface 77.

Shaft 72 and members 76 interact essentially as described above with respect to torque producing apparatus 20. However, member 76 includes connection portion 80, first arm 82, and second arm 84 which form a rectangular outer shape. Thus, the profile of outer member surface 77 appears substantially as a rectangle. (See FIG. 8).

Restraint 78 only engages connection portion 80 of member 76. Inner restraint surface 79 follows the contour of outer member surface 77 on connecting portion 80.

In operation, torque producing apparatus 70 is used to produce torque essentially as described above with respect to torque producing apparatus 20. As shaft 72 is rotated, friction between shaft 72 and member 76 causes member 76 to tend to rotate with shaft 72. However, inner restraint surface 79 contacts connection portion 80 of member 76 such that member 78 is not able to rotate relative to restraint 78. This produces torque.

Figure 9:
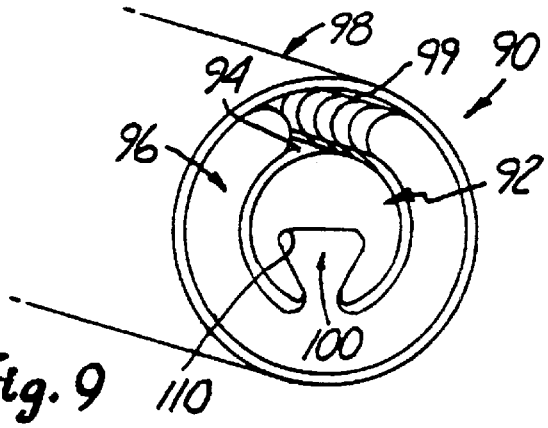
FIG. 9 is a perspective view of a friction hinge according to a fourth modification of the present invention.
Figure 10:
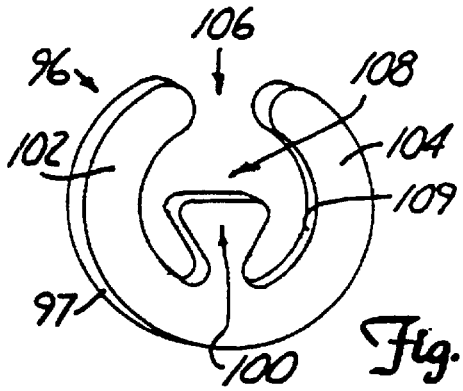
FIG. 10 is a perspective view of a clip for the friction hinge according to the fourth modification of the present invention.

FIGS. 9 and 10 show alternative torque producing apparatus 90 in accordance with the present invention. Torque producing apparatus 90 includes a non-circular shaft 92, a plurality of clip members 96 each of which have an outer member surface 97, and sleeve 98, which has an inner sleeve surface 99. Outer member surface 97 is frictionally engaged with inner sleeve surface 99.

Each member 96 has an outer member surface 97 and includes first arm 102 and second arm 104. First and second arms 102 and 104 are disjointed to define slit 106 and oriented to define connection portion 100. First and second arms 102 and 104 include inner member surface 109 which defines aperture 108. (See FIG. 10). When member 106 is in a relaxed state, outer member surface 97 has a diameter larger than that of inner sleeve surface 99. Consequently, when member 96 is oriented in sleeve 98, inner sleeve surface 99 frictionally engages outer member surface 97.

Shaft 92 has a shaft surface 94 and includes engagement portion 110 which interlocks with connection portion 100. Connection portion 100 is shaped to fit into engagement portion 110 so that shaft 92 may be inserted into members 96 as they are oriented inside sleeve 98.

In operation, torque producing apparatus 90 is used to produce torque. Sleeve 98 is mounted to a stationary device. Shaft 92 is attached to a rotatable body. The friction between member 96 and sleeve 98 produces torque which may be utilized in supporting the rotatable body at various angular locations relative to the stationary device.

As shaft 92 is rotated, the engagement of engagement portion 110 with connection portion 100, as well as the friction caused by the interference fit between outer member surface 97 and inner sleeve surface 99, causes sleeve 98 to tend to rotate with shaft 92. However, because sleeve 98 is mounted to the stationary device, member 96 will slip relative to sleeve 98 producing friction, or torque. The torque generated by torque producing apparatus 90 will be substantially the same in either direction of the rotation of shaft 92.

Figure 11:
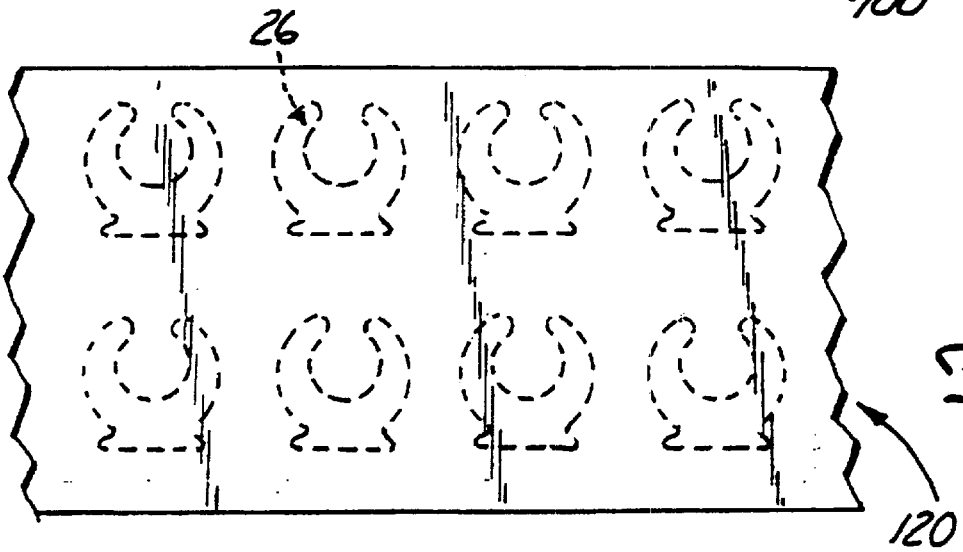
FIG. 11 illustrates the formation of multiple clips from a single sheet of material.

As shown in FIG. 11, a plurality of members 26 may be stamped out of a flat sheet of material 120. Processes such as stamping, fine blanking and EDM may be used to produce highly repeatable members 26 at relatively low cost. In this way, members 26 can be manufactured at very strict tolerances in order to be used in the apparatus of the present invention to produce highly repeatable torque.

Previous hinge designs, such as spring hinges, rely upon very difficult forming procedures to produces rounded and shaped metals from a flat material. This leads to inconsistent part tolerances and inconsistent torque. By avoiding all forming-type processing, the present invention generates very consistent torque.

Figure 13:
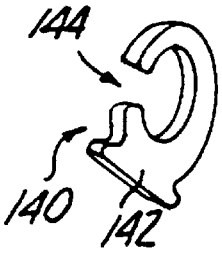
FIG. 13 is a perspective view of a clip for a friction hinge according to a sixth modification of the present invention.
Figure 12:
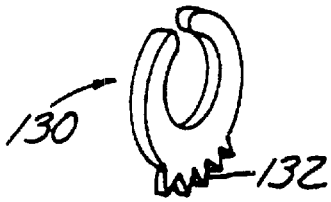
FIG. 12 is a perspective view of a clip for a friction hinge according to a fifth modification of the present invention.

Using the stamping process, varying shapes may easily be implemented for member 26. For example, member 56 (See FIG. 6), member 76 (See FIG. 8), and member 96 (See FIG. 10) can be manufactured using a stamping process. Further, member 26 can have connection portions 30 of varying configurations. FIGS. 12–13 show members 130 and 140 with corresponding connection portions 132 and 142.

A torque producing apparatus in accordance with the present invention that includes member 130 with connection portion 132 would include a restraint that was shaped to accept connection portion 132 in order to prevent relative rotation of member 130 with rotation of a shaft extending through member 130.

Member 140 includes connection portion 142 and slit 144. Connection portion 142 is located adjacent slit 144 rather than directly across from it. Thus, a torque producing apparatus in accordance with the present invention that includes member 140 with connection portion 142 would produce different torque dependant upon which direction a shaft extending through member 140 is rotated.

Although the present invention has been described with reference to preferred embodiments, workers skilled in the art will recognize that changes may be made in form and detail without departing from the spirit and scope of the invention.

What is claimed is:

1. A frictional torque hinge comprising:

a first member with an axial thickness having first and second resilient arms, each having a first and a second end, the first ends of the first and second arms being joined, and a connection portion adjacent the joined first ends of the first and second arms, the arms having an outer surface and a radial thickness greater than the axial thickness, the arms defining an axial aperture that defines at least a portion of an inner surface of the arms, the second ends of the arms defining an opening between the outer and inner surfaces;

a second member rotatably mounted relative to the first member having a surface arranged to engage tin interference fit against the inner or outer surface of the first member; and retention means engaging the connection portion of the first member so that the second member rotates relative to the first member upon relative rotation of the second member and the retention means.

2. The torque hinge of claim 1 wherein the second member is a rotatable shaft, the aperture defining a predetermined diameter of the inner surface of the first member, the shaft having a surface having an outer diameter greater than the predetermined diameter of the inner surface of the first member so that the surface of the shaft is engaged in interference fit to the inner surface of the first member.

3. The torque hinge of claim 2 wherein the retention means engages the connection portion of the first member so that the shaft rotates relative to the first member upon relative rotation of the shaft and the retention means.

4. The torque hinge of claim 1 wherein the second member is a sleeve, the outer surface of the first member having a predetermined diameter, the sleeve having a surface having an inner diameter smaller than the predetermined diameter of the outer surface of the first member so that the surface of the sleeve is engaged in interference fit to the outer surface of the first member.

5. The torque hinge of claim 4 wherein the connection portion of the first member is disposed within the aperture, and retention means includes a shaft extending through the aperture and having a surface configured to engage the connection portion of the first member so that the sleeve rotates relative to the first member upon relative rotation of the sleeve and the shaft.

6. The torque hinge of claim 1 wherein the first member is a clip stamped out of a flat material.

7. A frictional torque hinge comprising:

a member having an axis and an axially extending thickness, the member having an outer edge, an axial aperture, an opening between the outer edge and the aperture defining first and second resilient arms and a connection portion adjacent the first and second arms, the aperture having a predetermined diameter greater than the axially extending thickness;

a rotatable shaft rotatably mounted relative to the member and extending through the aperture, the shaft having a diameter greater than the diameter of the aperture such that the shaft frictionally engages the member; and retention means engaging the connection portion of the member so that the shaft rotates relative to the member upon relative rotation of the shaft and the retention means about the axis.

8. The torque hinge of claim 7 wherein the retention means is fixed in position relative to the shaft to prevent rotation of the member upon rotation of the shaft.

9. The torque hinge of claim 7 wherein the friction between the shaft and the member is independent of the engagement of the retention means and the connection portion.

10. The torque hinge of claim 7 wherein the opening is oriented opposite to the connection portion so that the first and second arms are equal in length and so that the friction between the shaft and the aperture is equal for both directions of rotation of the shaft.

11. The torque hinge of claim 7 wherein the opening is oriented opposite to the connection portion so that the first and second arms are unequal in length and so that the friction between the shaft and the aperture is unequal for each direction of rotation of the shaft.

12. The torque hinge of claim 7 wherein the connection portion comprises a rectangular projection with rounded edges extending tangentially from the first and second arms.

13. The torque hinge of claim 7 wherein the retention means includes a substantially cylindrical tube shaped to match the circular outer profile of the member.

14. The torque hinge of claim 7 wherein the connection portion comprises a sawtooth projection extending tangentially from the first and second arms.

15. The torque hinge of claim 7 wherein the member is stamped out of a flat material.

16. A torque device comprising:

a plurality of clips, each clip having an axial thickness and defining an aperture having a diameter, the diameter of the aperture being greater than the axial thickness, wherein each of the clips has an opening extending along and through its axial thickness forming two spaced apart resilient arms, and wherein the clips include antirotation means preventing rotation of the plurality of clips;

a rotatable shaft rotatably mounted relative to the clips and having an outer diameter, the shaft extending through the apertures of the clips, the outer diameter of the shaft being larger than the diameter of the apertures such that the shaft frictionally engages the clips; and stationary means engaging the antirotation means such that the plurality of clips are prevented from rotating relative to the stationary means as the shaft is rotated and the stationary means is held stable, and such that friction between the shaft and the plurality of clips is unaffected by the engagement.

17. The torque device of claim 16 wherein each of the clips include the antirotation means such that the clips and the antirotation means form a one piece unit.

18. The torque device of claim 16 wherein each of the clips is stamped out of a flat material.

19. A torque hinge device comprising:

a sleeve having an inner surface and an inner diameter;

at least one clip rotatably mounted relative to and within the sleeve and having an outer surface and an outer diameter, wherein the outer diameter is greater than the inner diameter of the sleeve such that the outer surface of the clip frictionally engages the inner surface of the sleeve, each clip having an axial thickness and an opening central to the clip, the outer diameter of the clip being greater than the thickness of the clip and the clip having an axially extending slit through its axial thickness forming two spaced apart resilient arms; and a shaft extending through the opening of each clip, the shaft configured for non-rotationally engaging the clip such that the clip rotates with the shaft as the shaft is rotated.

20. The torque device of claim 19 wherein the surface of the sleeve comprises a substantially cylindrical shape to match a profile of the surface of the clip.

21. The torque device of claim 19 wherein each of the clips is stamped out of a flat material.

*22. A frictional torque hinge comprising:*

*a rotatable shaft;*

*a plurality of flat members mounted on the shaft, each member having an axis, an axially extending thickness, an axial aperture, and an outer surface defining a profile, the profile having a width in a direction transverse to the axial direction that is greater than the thickness of the flat member, and the shaft extending through the aperture of the members such that the shaft frictionally engages the members; and*

*a connection portion engaging the members such that the shaft rotates relative to the members upon relative rotation of the shaft and connection portion, and wherein torque of the hinge increases as the number of members mounted on the shaft increases.*

*23. A frictional torque hinge comprising:*

*a shaft capable of rotation;*

*a plurality of flat metal members mounted side-by-side on the shaft, each member having an aperture through which that shaft extends causing frictional engagement between the member and shaft, each member having an outer surface forming a diameter, and each member having two surfaces that are essentially parallel to one another and essentially perpendicular to the shaft, the surfaces spaced apart to define a member thickness that is less than the diameter of the member, and wherein torque of the hinge increases as the number of members mounted on the shaft increases; and*

*a connector portion engaging the members such that when the shaft rotates relative to the members the connector holds the members together and prevents the members from rotating with the shaft.*

*24. The frictional torque hinge of claim 23 wherein the flat members are mounted on the shaft such that a surface of one of the plurality of members is touching a surface of an adjacent member.*

*25. A frictional torque hinge comprising:*

*a plurality of resilient clips having an axis and an axially extending thickness, the clips having an outer surface, and an axial aperture, the axially extending thickness of the clip being less that a diameter formed by the outer surface of the clip, and torque of the hinge increasing as the number of clips increases;*

*a rotatable shaft rotatably mounted relative to the clips and extending through the aperture of the clips, the shaft having a diameter greater than the diameter of the aperture of the clips such that the shaft frictionally engages the clips; and*

*a restraint engaging the clips such that the shaft rotates relative to the clips upon relative rotation of the shaft about the axis.*

*26. A frictional torque hinge comprising:*

*a shaft having an axis with an axial length and a diameter;*

*a plurality of members mounted on the shaft such that each frictionally engages the shaft, each member having a thickness and an outer surface forming a diameter that is greater than the thickness;*

*a restraint engaging the members such that the shaft rotates relative to the members upon relative rotation of the shaft about its axis; and*

*the members being mounted on the shaft such that the torque of the hinge increases as the number of members that are stacked on the shaft increases.*

* * * * *

UNITED STATES PATENT AND TRADEMARK OFFICE

CERTIFICATE OF CORRECTION

PATENT NO. : RE 37,712 E
APPLICATION NO. : 09/465171
DATED : May 28, 2002
INVENTOR(S) : Dean Gannon It is certified that error appears in the above-identified patent and that said Letters Patent is hereby corrected as shown below:

Column 10, line 26, delete “that” and insert in place thereof --than--.

Signed and Sealed this

Fifth Day of June, 2007

JON W. DUDAS
*Director of the United States Patent and Trademark Office*